Jan. 30, 1968   H. WEBER   3,366,523
METHOD AND APPARATUS FOR CONTINUOUSLY FORMING
FLUID-FILLED PADDING FROM THERMOPLASTIC WEBS
Filed Dec. 20, 1963   3 Sheets-Sheet 1

INVENTOR.
HANS WEBER
BY Jacobi & Davidson
Attorneys

Jan. 30, 1968     H. WEBER     3,366,523
METHOD AND APPARATUS FOR CONTINUOUSLY FORMING
FLUID-FILLED PADDING FROM THERMOPLASTIC WEBS
Filed Dec. 20, 1963     3 Sheets-Sheet 2
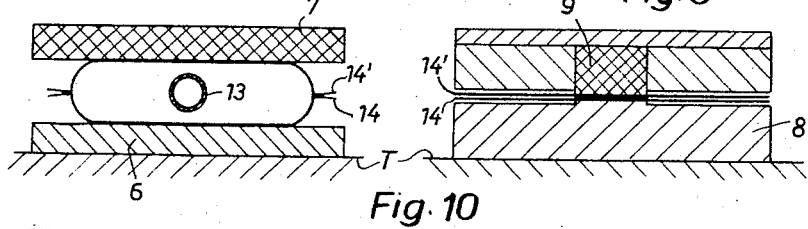
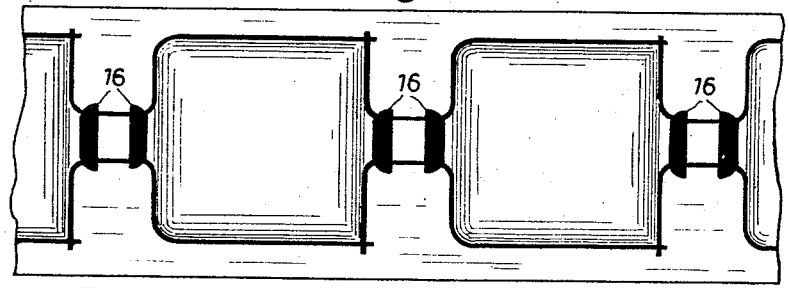
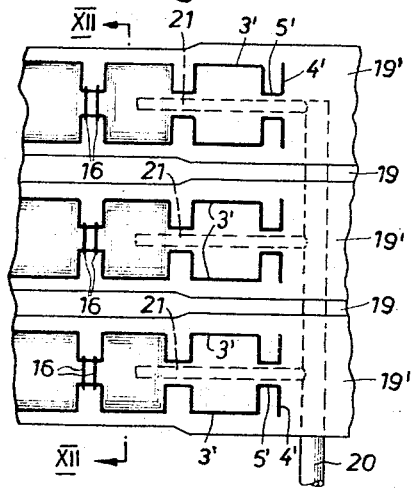
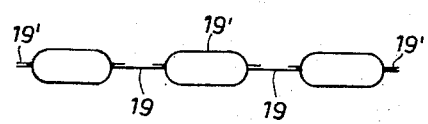
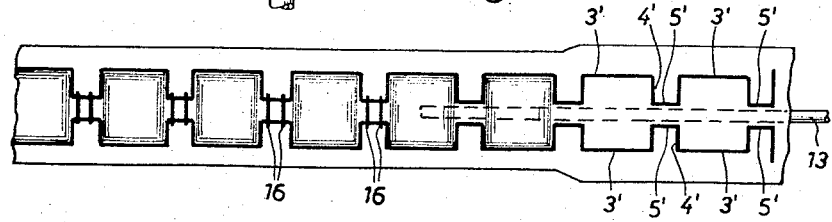
INVENTOR.
HANS WEBER
BY Jacobi & Davidson
Attorneys

INVENTOR.
HANS WEBER

United States Patent Office 3,366,523
Patented Jan. 30, 1968

3,366,523
METHOD AND APPARATUS FOR CONTINUOUSLY FORMING FLUID-FILLED PADDING FROM THERMOPLASTIC WEBS
Hans Weber, Alte Landstrasse 312, Mannedorf, Switzerland
Filed Dec. 20, 1963, Ser. No. 333,792
11 Claims. (Cl. 156—145)

ABSTRACT OF THE DISCLOSURE

A method of, and apparatus for the continuous manufacture of fluid-filled pads of the type employed for instance as protective cushioning for packaging goods or other items. The inventive method entails forming in succession each of the pads from a plurality of superimposed fluid-impermeable thermoplastic webs which are advanced along a work table. The individually formed pads are each filled with the fluid medium to the desired degree so that uniformity in height of each pad thus produced is absolutely insured. After filling, the fluid inlet opening of each such inflated pad is sealed. The inventive apparatus incorporates a work table for supporting a plurality of superimposed webs of thermoplastic material from which the pads are manufactured, a fluid-medium supply tube which is introduced between the webs to be interconnected, and at least one electrode for welding the contours of each of the pads up to a location defining a fluid inlet opening of the associated pad and through which the fluid-medium supply tube extends. Further, there is provided at least one electrode for closing by welding the fluid-inlet opening of each of the formed pads and means are also provided for holding flat the web portions immediately following the pads which are inflated.

Background of the invention

The present invention relates to an improved method of, and apparatus for the continuous manufacture of pads filled with a fluid medium, such as air or gas for instance, and of the type which may be employed as protective cushioning for packaging goods or other items.

Summary of the invention

The inventive method of continuously manufacturing pads formed from thermoplastic webs and filled with a fluid medium, such as air or gas, generally comprises the steps of passing a plurality of superimposed fluid-impermeable thermoplastic webs along a work table, placing a fluid medium-supply tube between each two superimposed thermoplastic webs, and advancing two associated superimposed thermoplastic webs step-by-step along the work table for at least the length of a pad plus the spacing between two adjacent pads. Thereafter, the webs are welded together by means of electrodes in order to form welding seams along the periphery of each of the pads to be formed and extending until a fluid inlet opening of the associated pad which is being formed and which receives the fluid medium-supply tube. Next, fluid medium is admitted into each of the formed pads while holding flat the web zone following the pad being filled, and then closing the fluid inlet opening of each pad after each such pad has been filled to the desired degree.

The inventive apparatus for the manufacture of fluid filled pads formed from thermoplastic webs, generally comprises a worktable adapted to support thereon at least two webs formed of thermoplastic material from which the pads are manufactured. A fluid medium supply tube is provided which is capable of being introduced between the webs to be interconnected, and at least one electrode is provided for welding the contours of each of the pads up to a location defining a fluid medium-inlet opening of the associated pad and through which the fluid medium-supply tube extends. Additionally, at least one electrode serves to close by welding the fluid medium-inlet opening of each of the formed pads, and further, means are provided for holding flat the web portions immediately following the pads which are inflated.

The inventive method and the apparatus for the performance thereof serve for the effective and economical production of fluid-filled pads which may be reliably employed for protective cushioning for the packaging of goods and wherein each such inflated pad can be positively filled with fluid medium to a desired degree.

The invention also enables the continuous manufacture of fluid-filled cushioning pads in a quick, efficient, reliable and economical manner, wherein each pad has a controlled height or degree of filling inasmuch as each pad is individually inflated.

Brief description of the drawings

The invention will be better understood, and objects and advantages other than those set forth above will become apparent, when consideration is given to the following detailed description thereof. Such description makes reference to the annexed drawings wherein:

FIGURE 8 is an enlarged sectional view of the apparatus shown in FIGURE 1, taken along the line VIII—VIII thereof;

FIGURE 9 is an enlarged sectional view of the apparatus depicted in FIGURE 1, taken along the line IX—IX thereof;

FIGURE 10 is a fragmentary top plan view of the final product in the form of a succession of air-filled connected pads produced according to the invention;

FIGURE 11 is a fragmentary, top plan view of a modification of the inventive apparatus;

FIGURE 12 is a sectional view of the arrangement shown in FIGURE 11, taken along the lines XII—XII thereof;

FIGURE 13 is a fragmentary, top plan view of a plastic base web on which are seated a succession of pads.

Description of the preferred embodiments

Figure 2:
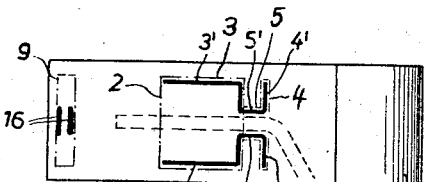
FIGURES 2 to 5 schematically illustrate the various operational steps for carrying into effect the inventive method.

With reference now, in particular, to FIGURES 1 to 9, it will be recognized that a work table T carries at its right-hand end portion a base plate 1 which forms a counter-element for the superimposed electrode 2 which is elevationally adjustable by suitable non-illustrated means. This electrode 2 advantageously comprises two spaced, parallel legs 3 possessing a length substantially corresponding to the length and width of the air or gas filled pads to be manufactured. The electrode legs 3 are connected to U-shaped welding electrodes 4 having cross-webs 5 which are in substantial parallelism to one another.

Reference numeral 6 denotes a mounting plate which, viewed in the direction of travel of the web members 14, 14′, is disposed downstream of the base plate 1 on the work table T. Further, it will be observed that the top of this mounting plate 6 is arranged somewhat lower than the top of the base plate 1. Above the mounting plate 6 there is located a stop plate 7 which is elevationally adjustable in any suitable manner and the function of which will be described in greater detail hereinafter. Continuing, it will also be recognized that after the mounting plate 6 the work table T further carries a counter-element 8 for a welding electrode 9 (FIGURES 1 and 9), the elevational position of which is adjustable by suitable non-illustrated means and which further incorporates two legs disposed at right angles to the webs 14, 14′.

Figures 6, 7:
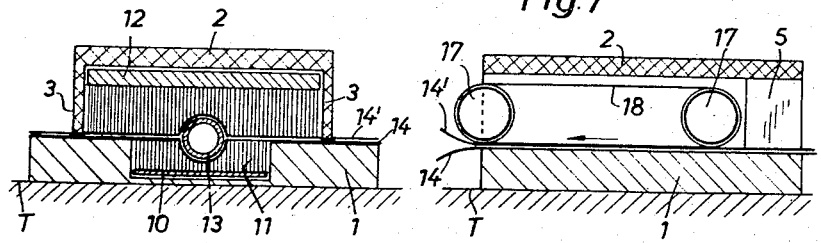
FIGURE 6 is a sectional view of the apparatus of FIGURE 1, taken along the line VI—VI thereof and shown on an enlarged scale.
FIGURE 7 is a side view of a detail modification of the inventive apparatus.

As best recognized by referring to FIGURE 6, the base plate 1 is provided with a recess 10 in which there is mounted a brush body 11 having upstanding bristles whose terminal ends are substantially flush with the top face of base plate 1. The ends of the bristles at the central region of brush body 11 form a substantially semi-circular recess which extends in the direction of feed of the thermoplastic webs 14, 14′ which are to be welded together. The electrode 2 which is formed as a hollow body additionally contains a brush body 12 provided with bristles, the free ends of which are directed towards the brush body 11. The central region or portion of the bristles of the brush body 12 are also provided with a semi-circular recess confronting and substantially corresponding to the aforementioned semi-circular recesses provided at the bristles of the brush body 11. These two confronting, semi-circular recesses conjointly form a substantially cylindrical opening which serves to accommodate the bent end-portion of a fluid supply tube or line 13, for instance for air, and the other end of which fluid supply tube 13 is connected to a suitable fluid medium supply source (not shown).

A pair of web supply rolls 15, 15′ are vertically disposed above one another and from which are paid off the gas-impermeable plastic webs 14, 14′ advantageously possessing the same width. These two web supply rolls 15, 15′ are advantageously substantially disposed in the same vertical alignment or line so that the two webs 14, 14′, are superimposed on top of one another during the manufacturing process.

These two webs 14, 14′ are subjected to the influence of a non-illustrated traction element which may comprise two coacting conveyor rolls for each web and between which the two webs 14, 14′ are passed for unwinding them from the associated supply rolls 15, 15′ respectively. These webs 14, 14′ are conveyed or conducted along the base plate 1, the mounting plate 6 and the counter-element 8 under the influence of the aforementioned traction elements.

Figure 5:
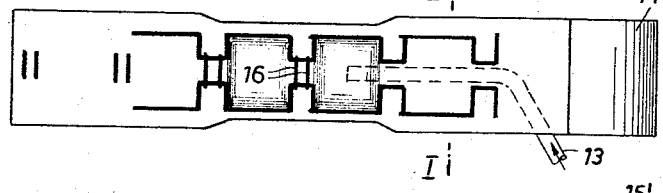
Figure 1:
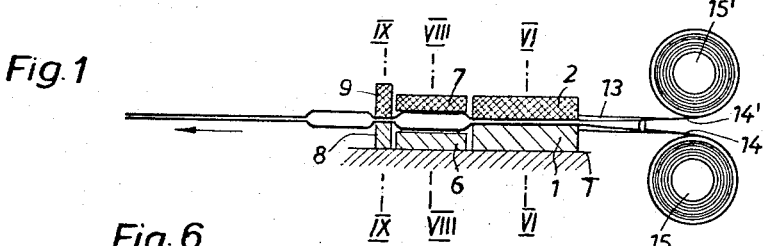
FIGURE 1 schematically illustrates a side view of the inventive apparatus.

The aforedescribed apparatus essentially functions as follows: It is assumed that the base web 14 and the cover web 14′ are paid off the associated supply rolls 15 and 15′ respectively, by means of the aforementioned conveyor rolls which are capable of being intermittently driven by a stepping mechanism. These two webs 14, 14′ are moved in superimposed position in the direction of the arrow of FIGURE 1 and above the base plate 1, the mounting plate 6 and the counter-element 8. Further, it is to be assumed that the bent-off end of the fluid supply line or tube 13 is positioned between the two webs 14, 14′ in such a manner that this bent-off tube end will fit into the substantially cylindrical recess provided at the bristles of the two confronting brush bodies 11 and 12, as shown in FIGURE 6, and will project beyond same for a certain amount, as best shown in FIGURES 2 and 5. It is also to be assumed that the fluid supply tube or line 13 is fed from an air compressor (not shown) or other suitable fluid supply device and that the welding electrodes 2 and 9 are connected to a source of high-frequency current.

Accordingly, the first operating step during manufacture of these pads is to heat the two electrodes 2 and 9 which are advantagously suitably positively interconnected for vertical movement and then to impress such electrodes 2, 9 upon the two superimposed webs 14, 14′ so as to cause electrode 2 to form the contour shown in FIGURE 2 with the full lines designated 3′, 4′, 5′ and corresponding to the size or contour of one fluid filled-pad plus the spacing between two adjacent pads, whereas the other welding electrode 9 at the same time forms two spaced welding seams 16 (FIGURE 2) extending at right angles to the direction of web feed.

Figure 3:
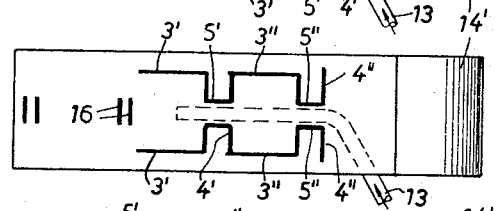

In the second manufacturing step the webs 14, 14′ are further displaced towards the left into the position shown in FIGURE 3 and, more specifically, are displaced through a distance substantially corresponding to the length of the pad to be manufactured plus the spacing between two adjacent pads, i.e., corresponding to the length of the electrode 2. After this movement has taken place, the electrodes 2 and 9 are again placed in operation, in other words are pressed onto the webs 14, 14′ with the following results: Behind the contours for a first incomplete air pad, and the seam 4′ of a second pad formed in the first step, are formed the contours 3″, 5″ of the second pad and the seam 4″ of a third pad. At the same time, two welding seams 16 extending transversely at the middle of the two webs 14, 14′ are formed by the electrode 9.

Figure 4:
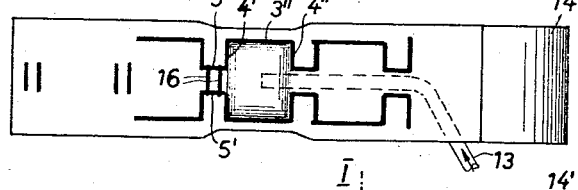

As best recognized by inspecting FIGURE 4, during the third step in the manufacturing process in which the webs 14, 14′ are again advanced for the length of a pad plus the spacing between two adjacent pads, these electrodes 2 and 9 are again operated in the manner described above so as to interconnect the two contour portions or webs 5′ of the adjacent U-shaped welding contours by two welding seams 16. Therefore, when filling the pad air or any other fluid medium is prevented from escaping at the left side of the pad formed by the seams 4′, 3″ and 4″. The first complete pad may now be filled, as seen in FIGURE 4, while at the same time the webs of the succeeding web zone underneath the electrode 2 and which already incorporates the contours for the next following pad to be filled, are pressed flat against each other by the pressure element means in the form of the bristles of the two brush bodies 11 and 12, so that the air cannot escape towards the right from the pad being filled.

Succeeding pads are then formed in successive cycles of operation as shown in FIGURE 5, whereby the air supply or other fluid supply may be delivered continuously. The degree of filling of the pads with the desired fluid medium, in this case assumed to be air, may be determined by the stop plate 7 (FIGURE 1) which, it will be recalled, is adjustable in elevation and is disposed above the mounting plate 6.

Furthermore, the same effect may be also attained by appropriately metering the fluid supply, or by feeding the gas or air under a predetermined pressure into the pad to be filled. Moreover, instead of employing brushes as shown in FIGURE 6, the zone of the webs 14, 14′ following the pad to be filled with air or otherwise could be equally maintained flat, not by the device as shown in FIGURE 6, but by a modified form of pressure element as shown in FIGURE 7, so as to prevent the air from escaping from the pad which is being filled. More precisely, in FIGURE 7 this is effected by an endless band member 18 which is trained about a pair of power driven rollers 17. This band member 18 provides the pressure element which tends to press the plastic webs 14, 14' against the base plate 1.

Still, the same result may be also obtained by means of a pressure plate which is subjected to fluid pressure, or by means of a roller-like resiliently mounted pressure element which acts against the webs lying on base plate 1. In such case, the pressing or pressure elements coacting with the base plate 1 would have to be suitably provided with a recess extending in the feed direction of the webs 14, 14' and adapted to accommodate the end of the fluid medium-supply tube or line 13.

Additionally, instead of producing a single row of air pads from two superimposed plastic webs it would be possible to form a plurality of superimposed pad rows from a plurality of superimposed webs, in which case air or the like would have to be supplied between each two superimposed webs.

Further, as shown in the modification of FIGURE 11 the heretofore described apparatus may be also constructed in such a manner that a plurality of transversely spaced, upper webs are laid upon a comparatively wide base web 19, so that a plurality of pads may be formed side-by-side in one operation with the aid of a corresponding number of electrodes. In such case, it will be recognized that air discharge tubes 21 (FIGURE 11) are connected to the air supply tube or line 20. These branch tubes 21 are spaced from each other in such a manner that they extend along substantially the center lines of the upper or cover webs 19'.

The various steps of manufacture required for the production of the air pads or the like are carried out in successive cycles which suitably are controlled from a central location.

Figure 14:
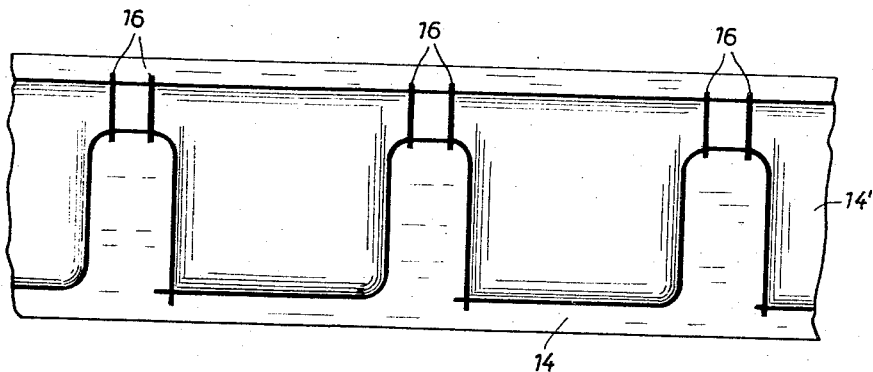
FIGURES 14 and 15 depict top plan views of two different embodiments of air or gas filled pads produced according to the method of the present invention.

The air pads produced according to the embodiment shown in FIGURE 14 differ from those previously described only insofar as the air inlet openings for filling the pads are situated at one of the longitudinal sides of each associated pad instead of substantially at the center line of the pads. Accordingly, the welding tools have to be correspondingly shaped, although it will be recognized the method of manufacturing these pads is carried out in the same manner as heretofore described. In this case, the reference numeral 16 denotes a pair of welding seams positioned between such pads.

Figure 15:
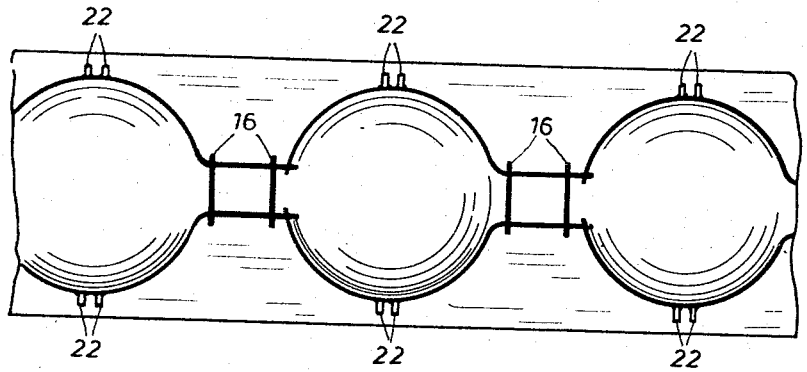

Finally, FIGURE 15 shows an embodiment of spherical air pads or otherwise fluid filled pads which are produced according to the inventive method heretofore disclosed and using appropriately formed welding tools. In the filling position of these pads, the supporting plate and the stop plate are suitably provided with corresponding semi-circular recesses. The ball-shaped air pads comprise on their surfaces two pairs of diametrically opposite holding elements 22 which are located at a small distance from one another and are adapted to be stuck onto surface holders.

It should be apparent that the method heretofore described possesses the noteworthy advantage that it permits a fully automatic manufacture of fluid-filled pads such as are used to advantage as protective cushions in the packaging of goods which are sensitive to shocks, and that such method can be realized with relatively simple equipment.

Of course, instead of filling the pads with air they could also be filled with nitrogen for instance, or, in fact, with any other suitable fluid medium.

While there is shown and described present preferred embodiments of the invention it is to be distinctly understood that the invention is not limited thereto but may be otherwise variously embodied and practiced within the scope of the following claims. Accordingly,

What I claim and desire to secure by Letters Patent, is:

1. A method of continuously manufacturing pads formed from thermoplastic webs and filled with a fluid medium, comprising the steps of:
   passing a plurality of superimposed fluid-impermeable thermoplastic webs along a work table,
   placing a fluid medium-supply tube between each two superimposed thermoplastic webs,
   advancing two associated superimposed thermoplastic webs step-by-step along said work table for at least the length of a pad plus the spacing between two adjacent pads;
   welding together the webs to form the contours of each of the pads up to a location defining a fluid inlet opening of the associated pad being formed and receiving said fluid medium-supply tube,
   admitting a fluid medium into each of the thus formed pads while holding flat the web zone following the pad being filled,
   and closing the fluid inlet opening of each pad after each pad has been filled to the desired degree.

2. A method of continuously manufacturing pads as defined in claim 1, wherein the steps of passing the webs along the table, welding the pad contours, filling the pads, holding flat the web zone following the pad being filled, and closing the fluid inlet opening, are all effected in successive cycles of operation.

3. A method of continuously manufacturing pads as defined in claim 1, including the steps of limiting the degree of filling of the pads which are to be inflated by the fluid medium.

4. A method of continuously manufacturing pads as defined in claim 1, including the steps of controlling the degree of filling of the pads with fluid medium by metering the supply of said fluid medium.

5. A method of continuously manufacturing pads as defined in claim 1, wherein a plurality of spaced, narrow cover webs are each placed upon a wide base web, the width of said cover webs corresponding to the diameter of the pads to be formed, then passing said cover webs together with said base web along the work table, and simultaneously forming in a single operation a number of said pads corresponding to the number of cover webs.

6. An apparatus for the manufacture of fluid-filled pads formed from thermoplastic webs, comprising a work table adapted to support thereon at least two superimposed webs formed of thermoplastic material from which the pads are manufactured, a fluid medium-supply tube capable of being introduced between the webs to be interconnected, at least one electrode for welding the contours of each of the pads up to a location defining a fluid inlet opening of the associated pad and through which the fluid medium-supply tube extends, at least one electrode for closing by welding the fluid inlet opening of each of the formed pads, and means for holding flat the web portions immediately following the pads which are inflated.

7. An apparatus for the manufacture of fluid-filled pads formed from thermoplastic webs as defined in claim 6, wherein said holding means comprises a pressure element means acting on the superimposed webs for holding flat the portion of the webs immediately following the pad being manufactured.

8. An apparatus for the manufacture of fluid-filled pads formed from thermoplastic webs according to claim 7, wherein said pressure element means comprises two brush bodies having bristles between which are passed the superimposed webs.

9. An apparatus for the manufacture of fluid-filled pads formed from thermoplastic webs as defined in claim 7, wherein said pressure element means comprises an endless band means, roller means over which said endless band means passes.

10. An apparatus for the manufacture of fluid-filled pads formed from thermoplastic webs according to claim 6, further including web supply rolls from which the superimposed webs are paid off.

11. An apparatus for the manufacture of fluid-filled pads formed from thermoplastic webs as defined in claim 6, wherein said fluid medium-supply tube comprises a number of branch tubes leading between superimposed webs comprising a base web and a plurality of transversely spaced upper webs, said number of branch tubes corresponding at least to the number of upper webs.

References Cited

UNITED STATES PATENTS

| | | | |
|---|---|---|---|
| 3,245,197 | 4/1966 | Van Mil et al. | 53—180 |
| 3,001,340 | 9/1961 | Gosman | 53—180 X |
| 2,470,990 | 5/1949 | Kennedy | 156—145 |
| 2,522,079 | 9/1950 | Winstead | 156—145 |
| 3,084,514 | 8/1962 | Bentele et al. | 156—145 |
| 3,206,345 | 9/1965 | Stickel | 156—145 |
| 3,011,930 | 12/1961 | Dworak | 156—145 X |

EARL M. BERGERT, *Primary Examiner.*

PHILIP DIER, *Examiner.*